United States Patent [19]

Kobayashi

[11] 4,413,347

[45] Nov. 1, 1983

[54] TERNARY TO BINARY PULSE REGENERATOR FOR A REGENERATIVE REPEATER

[75] Inventor: Hirokazu Kobayashi, Tokyo, Japan

[73] Assignee: Nippon Electric Co., Ltd., Tokyo, Japan

[21] Appl. No.: 232,234

[22] Filed: Feb. 6, 1981

[30] Foreign Application Priority Data

Feb. 25, 1980 [JP] Japan .................................. 55-22481
Mar. 6, 1980 [JP] Japan .................................. 55-28522

[51] Int. Cl.$^3$ ........................................... H03K 13/24
[52] U.S. Cl. ............................... 375/20; 340/347 DD
[58] Field of Search ................... 375/4, 11, 12, 14, 17, 375/20; 340/347 DD; 328/155; 333/18, 28 R; 178/70 TS, 70 S; 307/511, 513, 514, 516; 179/170 R; 358/262; 455/608

[56] References Cited

U.S. PATENT DOCUMENTS 3,538,246 11/1970 Macovski et al. ................. 375/17 X
4,355,397 10/1982 Stuart ..................................... 375/17

OTHER PUBLICATIONS

NTC 1977–Conference Record, vol. 3.
IEEE Transactions on Communication Technology, vol. Com. 17, No. 2, Apr., 1969, "Bipolar Pulse Transmission with Zero Extraction".
IEEE Communication Technology, Paper 70TP11–COM "Compatible High Density Bipolar Codes: An Unrestricted Transmission Plan for PCM Carriers".

Primary Examiner—Robert L. Griffin
Assistant Examiner—Albert W. Watkins
Attorney, Agent, or Firm—Laff, Whitesel, Conte & Saret

[57] ABSTRACT

A pulse regenerator is installed at a repeater having an equalizing amplifier for equalizing a ternary pulse sequence received from a transmission line. Responsive thereto, a first ternary pulse sequence is produced with a phase that is the same as the phase of the equalized ternary pulse sequence. A second ternary pulse sequence has a phase which is the reverse of the phase of the equalized ternary pulse sequence. The pulse regenerator also receives a clock pulse sequence which is derived from the input ternary pulse sequence. A first timing signal having the same phase as the clock pulse sequence and a second timing signal having a phase which is the reverse of the phase of the clock pulse sequence is produced in response to the clock pulse sequence. The first and second ternary pulse sequences are compared with a predetermined value, in synchronism with the first timing signal, and the two comparison results are produced as an output. A detecting circuit operates in synchronism with the second timing signal, for detecting one of the two comparison results.

11 Claims, 4 Drawing Figures

TERNARY TO BINARY PULSE REGENERATOR FOR A REGENERATIVE REPEATER

This invention relates to a pulse regenerator equipped with a regenerative repeater for use in a pulse code-modulation (PCM) transmission system.

In a conventional PCM transmission system, regenerative repeaters are provided at certain intervals to achieve pulse regeneration by compensating for the attenuation and waveform distortion of transmission pulses.

For the purpose of system economization, a less power-consuming repeater is descried in a paper entitled "A Low Power Regenerative Repeater for the T1 Digital Carrier System" by Peter B. Cunningham et. al., NTC '77 Conference Record, Volume 3, pp. 44:1-1-44:1-3 presented at a National Telecommunication Conference held in Los Angeles from Dec. 5 through 7, 1977 (Reference 1). The described repeater comprises an equalizing amplifier, a timing extracting circuit and a pulse regenerator. Particularly, the equalizing amplifier and the timing extracting circuit are designed to operate at a reduced power consumption. However, the whole regenerator tends to consume a comparatively large amount of power, since it is always kept ready to start. Also, two sets of identical circuits are indispensable to the regenerator with the result that the whole device becomes complicated.

More detail, as shown in FIG. 4 of Reference 1, each of the circuits is composed of a decision circuit (gates 3 and 4, a condenser) for deciding whether there is a presence or an absence of an input signal at the falling edge of a clock pulse fed to a clock terminal. A flip-flop circuit (made up of gates 6 and 7) is required for holding the output of the decision circuit. As a result, the use of the condenser does not allow the repeater to be manufactured from a monolithic integration circuit.

One object of the present invention is therefore, to provide a simplified pulse regenerator capable of operating with less power consumption.

According to one aspect of the invention, a pulse regenerator is installed at a repeater having an equalizing amplifier for equalizing a ternary pulse sequence which is received from a transmission line. The repeater has a first input terminal for receiving the equalized ternary pulse sequence. Responsive to the equalized ternary pulse sequence received at the first input terminal, a first ternary pulse sequence is produced with a phase which is the same as the phase of the equalized ternary pulse sequence and a second ternary pulse sequence is produced with the reverse phase. A second input terminal receives a clock pulse sequence which is derived from the input ternary pulse sequence. Responsive to this clock pulse sequence, a first timing signal is produced with a phase which is the same as the phase of the clock pulse sequence and a second timing signal is produced with the reverse phase. A deciding circuit compares the first and second ternary pulse sequences with a predetermined value, in synchronism with the first timing signal and supplies the two comparison results as its output. In synchronism with the second timing signal, a detector detects which of the two comparison results is produced from the deciding means. The detected output of the deciding circuit is then held.

The invention will now be described in greater detail in conjunction with the accompanying drawings, wherein:

FIG. 1 shows a circuit diagram of one embodiment of the invention;

FIGS. 2(a) to (k) show waveforms for describing the operation of the FIG. 1 circuit;

In the drawings, the same reference numerals denote the same structural elements.

Figure 1:
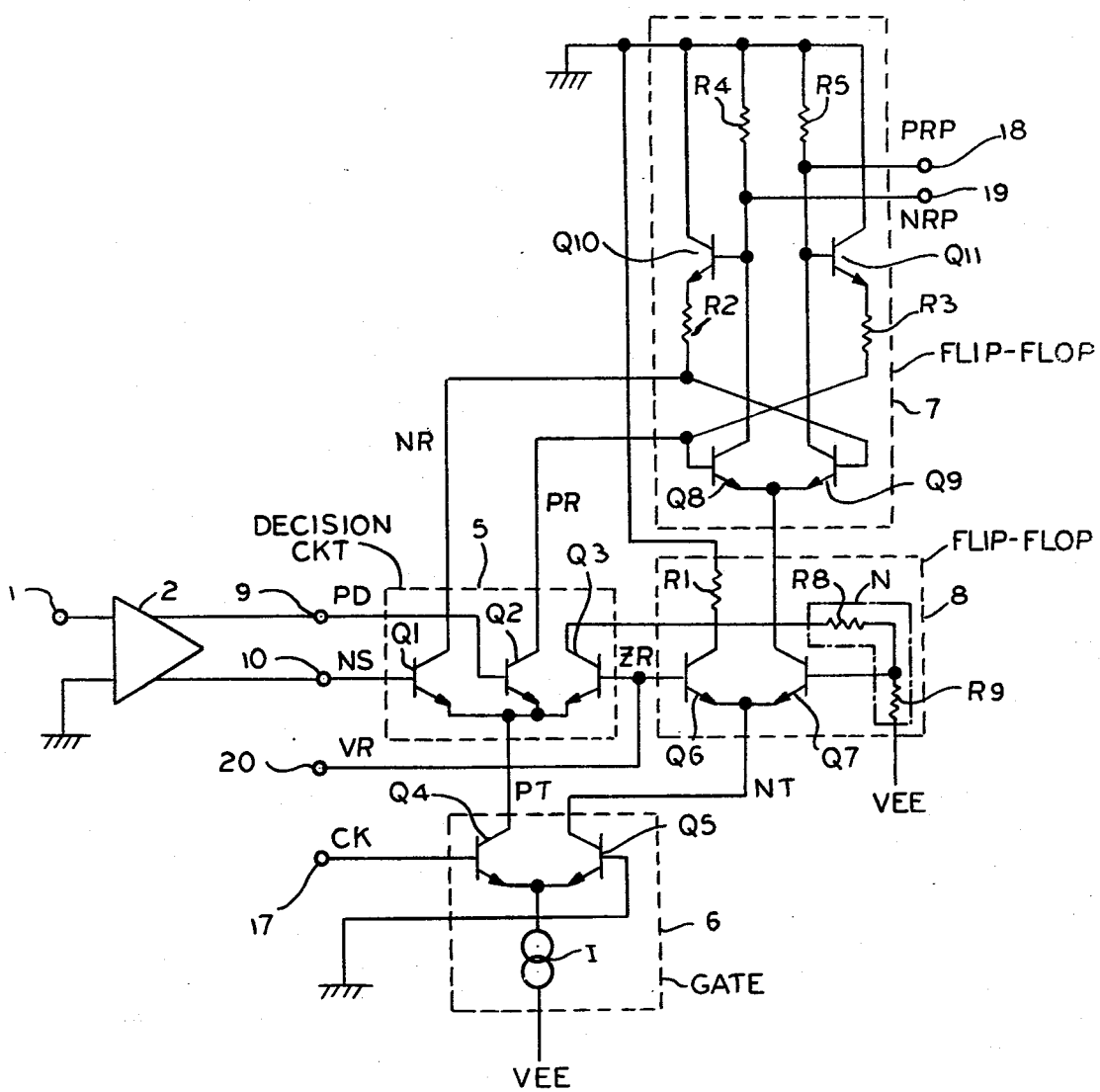

In FIG. 1, a bipolar pulse sequence is used as an input pulse sequence among available ternary pulse sequences. One embodiment comprises an operational amplifier 2, a decision circuit 5, a gate circuit 6, and flip-flops 7 and 8. A bipolar pulse sequence received from a transmission line (not shown) is supplied to the equalizing amplifier shown in FIG. 1 of Reference 1.

The equalized bipolar pulse sequence is then given to an input terminal 1. The amplifier 2 produces two differential outputs, in response to the pulse sequence received at the terminal 1. These outputs are regular-phase and reverse-phase bipolar pulse sequences (FIGS. 2(a) and (b) as compared to the phase of the pulse sequence received at the terminal 1. A clock pulse sequence CK (FIG. 2(c)), is produced from the timing circuit shown in FIG. 1 of Reference 1 in response to the bipolar pulse sequence fed from the transmission line. This clock pulse sequence CK is given to a terminal 17.

The gate circuit 6 having transistors Q4 and Q5 is used to derive, in synchronism with each pulse of the sequence CK given to the terminal 17, a regular-phase timing signal PT (FIG. 2(k)) in the same phase as the CK signal and a reverse-phase timing signal NT (FIG. 2(g)) in the phase which is reverse to the phase if the sequence CK. The signal PT is given to the decision circuit 5 comprising transistors Q1 to Q3. The transistor Q1 or Q3 of the circuit 5, in synchronism with the signal PT, compares the regular-phase (or reverse-phase bipolar) pulse sequence fed from the amplifier 2 with a threshold reference voltage VR given to a terminal 20. If the regular-phase (or reverse-phase bipolar) pulse sequence is greater than the threshold voltage VR, the transistor Q1 (or Q2) turns "ON" to give a positive decision signal PR (FIG. 2(d)) (or a negative decision signal NR (FIG. (e)) ). If both of the sequences are smaller than the threshold voltage VR, the transistor Q3 of the circuit 5 turns "ON" to give a zero decision signal ZR (FIG. 2(f)), which is given to the flip-flop 8.

The flip-flop 8 is composed of transistors Q6 and Q7, a resistor R1 for providing the base voltage of the transistor Q7, and a level-shift circuit N including resistors R8 and R9 for varying the base voltage by a predetermined value, with respect to a voltage given to the base of the transistor Q6. The flip-flop 8 detects a "0" of the signal ZR, which indicates that either the transistor Q1 or Q2 is "ON" in response to the signal NT from the gate circuit 6. The consequent detection signal DT (FIG. 2(h)) is given to the flip-flop 7 comprising transistors Q8 to Q11 and resistors R2 to R5.

Figure 2:
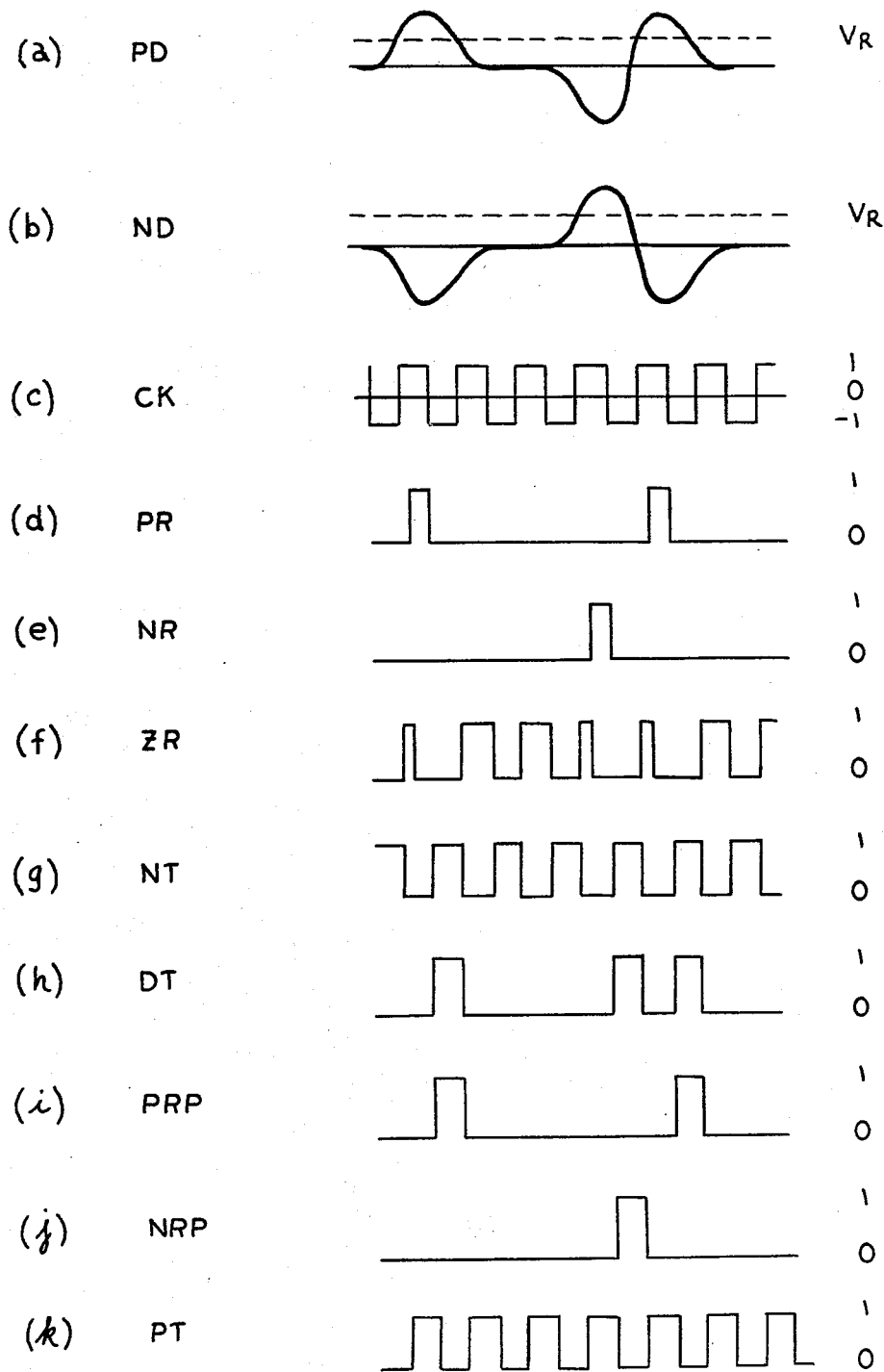

In synchronism with the signal DT from the flip-flop 8 and the positive or negative decision signal PR or NR given from the decision circuit 5, the flip-flop 7 gives to a terminal 18 or 19 a positive regenerated signal PRP (FIG. 2(8)) or a negative regenerated signal NRP (FIG. 2(j)). More specifically, in the "ON" state of the transistor Q1, a current flows to the collector of the transistor Q1 via the transistor Q10 and the resistor R2 as soon as the signal DT is given to the transistor Q1 from the flip-flop 8. As a result, the base voltage of the transistor Q9 falls below that of the transistor Q8, so that the transistor Q8 may turn "ON" to cause a current flow across the resistor R4. This current produces a voltage drop in the resistor R4, which is taken from the terminal 18 as the signal PRP. When the transistor Q2 switches "ON", the negative regenerated signal NRP is taken from the terminal 19 in an operation similar to that of the transistor Q1.

Figure 4:
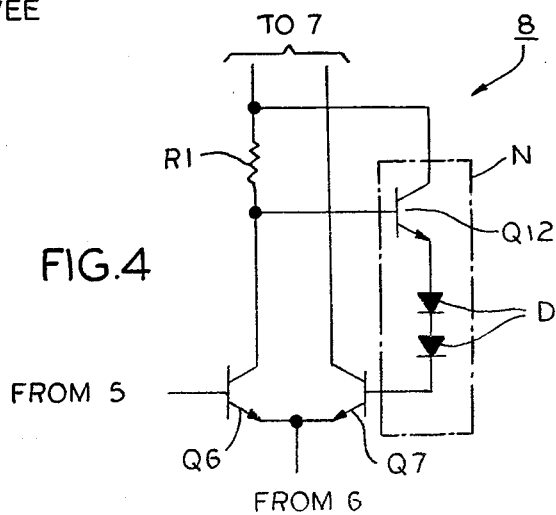
FIG. 4 shows a part of the circuit shown in FIG. 1.

The level-shift circuit N in the flip-flop 8 may be composed of a transistor Q12 and a diode or diodes D, as shown in FIG. 4. In this structure, the transistor Q12 increases the impedance of the circuit N. These signals PRP and NRP are supplied either to the transmission line or to a PCM terminal system for demodulation, after being added by a transformer referred to in FIG. 4 of Reference 1.

Figure 3:
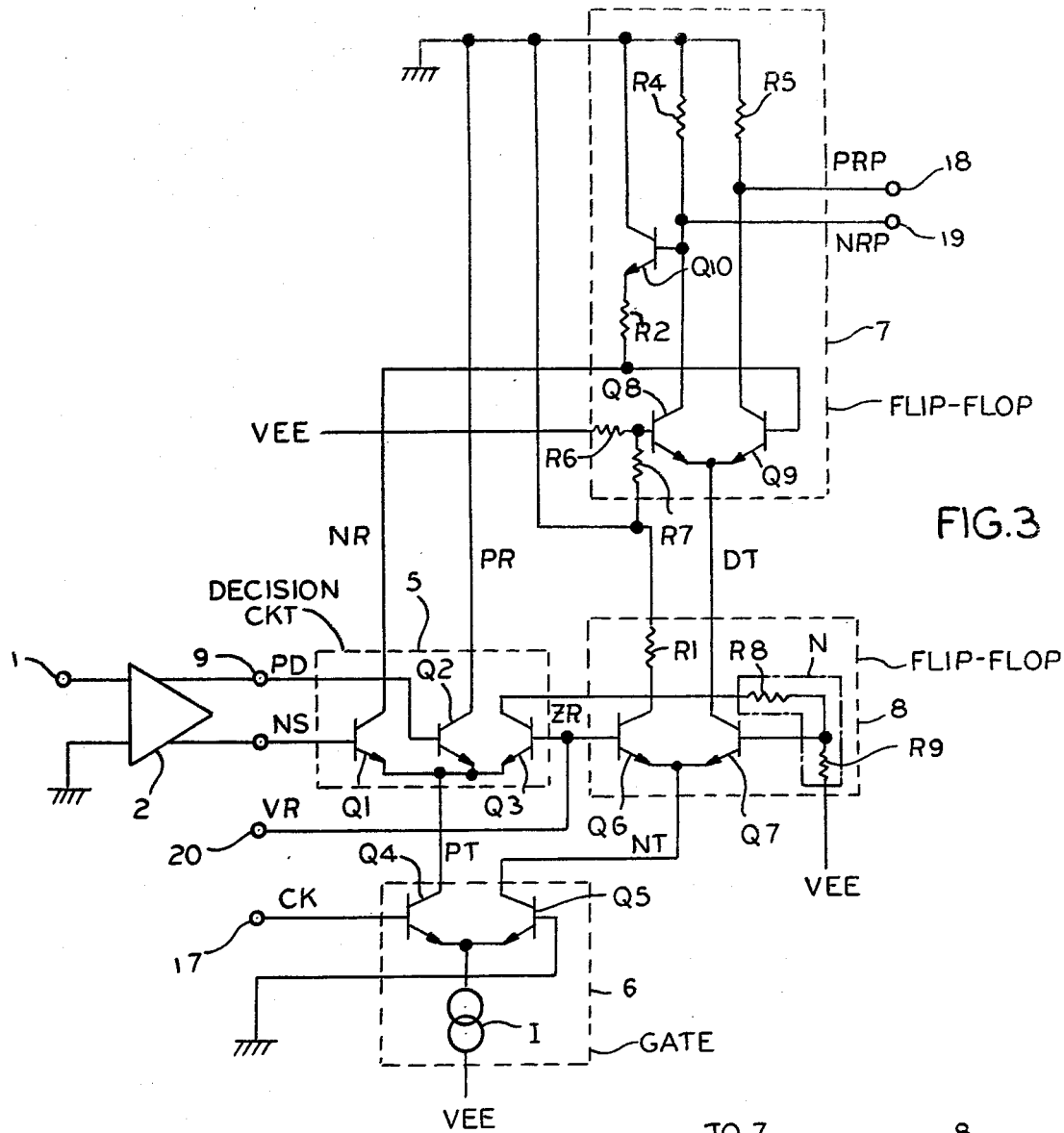
FIG. 3 show a block diagram of another embodiment.

Referring to FIG. 3, which shows another embodiment, a positive decision signal PR of the decision circuit 5 is grounded and only a positive decision signal NR is given to the flip-flop 7, to dispense with the transistor Q11 used in the flip-flop 7 shown in FIG. 1. In this connection, the flip-flop 7 has biassing resistors R6 and R7 to keep the base voltage of the transistor Q8 of the flip-flop 7 below that of the transistor Q9 when the transistor Q1 is "OFF". The operation of this embodiment wll not be described hereunder because it is the same as that of the embodiment illustrated in FIG. 1.

Although the bipolar pulse sequence is used as the input ternary pulse sequence in the foregoing embodiments, other ternary pulse sequences such as the B6ZS (bipolar with 6 zeros substitution) code sequence and the CHDB3 (compatible high density bipolar) code sequence may be used. For details of these code sequences, reference is made to a paper by V. I. Johannes et al., entitled "Bipolar Pulse Transmission with Zero Extraction", IEEE Transactions, On Communication Technology, Vol. COM-17, No. 2, April issue, 1969, pp. 303–310 (Reference 2) and a paper by A. Croiser, entitled "Compatible High-Density Bipolar Codes", IEEE Transactions, On Communication Technology, COM-18, June issue, 1970, pp. 266–268 (Reference 3).

As described above, the present invention permits the regeneration for both positive and negative pulse sequences with a single common circuit, resulting in a more simplified, less power-consuming device suitable for an IC (integration circuit) fabrication.

What is claimed is:

1. A pulse regenerator for use in a repeater having an equalizing amplifier for equalizing a reception ternary pulse sequence received from a transmission line, said regenerator comprising:

a first input terminal for receiving the equalized ternary pulse sequence;

means responsive to said equalized ternary pulse sequence for producing a first ternary pulse sequence having a phase which is the same as the phase of said equalized ternary pulse sequence and a second ternary pulse sequence having a phase which is the reverse of the phase of said equalized ternary pulse sequence;

a second input terminal for receiving a clock pulse sequence derived from said input ternary pulse sequence;

means responsive to said clock pulse sequence for producing a first timing signal having a phase which is the same as the phase of said clock pulse sequence and a second timing signal having a phase which is the reverse of the phase of said clock pulse sequence;

deciding means for comparing said first and second ternary pulse sequences with a predetermined value in synchronism with said first timing signal and for supplying two comparison results as its output; and detecting means for detecting in timed relationship with said second timing signal that the one of two comparison results is produced from said deciding means; and means for holding the output of said deciding means.

2. A pulse regenerator with low power consumption, said regenerator comprising: means responsive to a receipt of an input ternary pulse sequence for generating first and second ternary pulse sequences having opposite phases, one of said generated ternary pulse sequences having a phase coinciding with the phase of said received sequence, means responsive to a clock pulse sequence received with said input ternary pulse sequence for generating first and second timing signals having opposite phases, one of said timing signals having a phase coinciding with the phase of said received clock pulse sequence, means responsive to one of said generated timing signals for comparing said first and second generated ternary pulse sequences with a reference signal, and means responsive to said comparing means for holding a signal selected from said generated ternary pulse sequence.

3. The regenerator of claim 2 wherein said generated ternary pulse sequences are bipolar pulse sequences.

4. The regenerator of claim 2 and means responsive to said comparing means for selecting one of said generated ternary pulse sequences and for supplying a selected one of either a positive regenerated signal or a negative regenerated signal.

5. The regenerator of claim 4 and means for supplying said selected regenerated signal to a transmission line.

6. The regenerator of claim 4 and means for supplying said selected regenerated signal to a PCM terminal system.

7. The regenerator of claim 5 or 6 and means for adding said positive and negative regenerated signals prior to said supplying of said signals.

8. The regenerator of claim 7 wherein said adding means comprises a transistor having an emitter-collector circuit in series with at least one diode, said transistor controlling the output impedance of said regenerator.

9. The regenerator of claim 2 wherein said input ternary pulse sequence is a bipolar pulse sequence.

10. The regenerator of claim 2 wherein said input ternary pulse sequence is a bipolar with six zeroes substitution code.

11. The regenerator of claim 2 wherein said input ternary pulse sequence is a compatible high density bipolar code.

* * * * *